(12) United States Patent
Glodz et al.

(10) Patent No.: US 8,035,560 B1
(45) Date of Patent: Oct. 11, 2011

(54) SYSTEM AND APPARATUS FOR TRACKING A PERSON OR AN ANIMAL

(76) Inventors: Adrian Glodz, Schaumburg, IL (US); Peter Walega, Elmhurst, IL (US)

(*) Notice: Subject to any disclaimer, the term of this patent is extended or adjusted under 35 U.S.C. 154(b) by 292 days.

(21) Appl. No.: 12/274,713

(22) Filed: Nov. 20, 2008

Related U.S. Application Data

(60) Provisional application No. 60/989,315, filed on Nov. 20, 2007.

(51) Int. Cl.
*G01S 19/31* (2010.01)
(52) U.S. Cl. .................................. 342/357.71
(58) Field of Classification Search ............. 342/357.63, 342/357.71, 357.74; 701/213, 215
See application file for complete search history.

(56) References Cited

U.S. PATENT DOCUMENTS

| | | |
|---|---|---|
| 1,597,823 A | 8/1926 | Randolph |
| 2,760,278 A | 8/1956 | Agrillo |
| 2,897,609 A | 8/1959 | Bodkin |
| 3,588,858 A | 6/1971 | Demuth |
| 4,703,445 A | 10/1987 | Dassler |
| 4,854,328 A | 8/1989 | Pollack |
| 4,870,700 A | 9/1989 | Ormanns et al. |
| 5,285,586 A | 2/1994 | Goldston et al. |
| 5,473,518 A | 12/1995 | Haber et al. |
| 5,557,259 A | 9/1996 | Musa |
| 5,574,432 A | 11/1996 | McCarthy |
| 5,650,769 A | 7/1997 | Campana, Jr. |
| 5,652,570 A | 7/1997 | Lepkofker |
| 5,655,316 A | 8/1997 | Huang |
| 5,714,932 A | 2/1998 | Castellon et al. |
| 5,731,785 A | 3/1998 | Lemelson et al. |
| 5,748,087 A | 5/1998 | Ingargiola et al. |
| 5,838,237 A | 11/1998 | Revell et al. |
| 5,970,631 A | 10/1999 | Inman |
| 6,012,822 A | 1/2000 | Robinson |
| 6,014,080 A | 1/2000 | Layson, Jr. |
| 6,084,517 A | 7/2000 | Rabanne et al. |
| 6,247,251 B1 | 6/2001 | James |
| 6,259,399 B1 | 7/2001 | Krasner |
| 6,262,660 B1 | 7/2001 | Segale et al. |

(Continued)

FOREIGN PATENT DOCUMENTS

WO WO 00/74306 5/2000

OTHER PUBLICATIONS

Wearable Caddy—Products of CTX Corporation, CTXC—The PLS Company—Personal Location Services—Integrating CPS tr . . ., p. 1 of 1, Aug. 2, 2007, http://www.gtxcorp.com/about/product/product-wearble-caddy.htm.

(Continued)

*Primary Examiner* — Dao Phan
(74) *Attorney, Agent, or Firm* — Neat, Gerber & Eisenberg LLP

(57) ABSTRACT

This invention relates to a system and apparatus for tracking a target object, such as a person or an animal, using at least one of a global positioning system (GPS) satellite network, a cellular network, a radio frequency network, a telephone network, and a computer network using a multifunctional transceiver carried or mounted on or by the target object being tracked. The transceiver may be configured for mounting on or integrally a belt or collar worn by the target object being tracked. The transceiver may relay position and/or location information of the transceiver, and ultimately the target object being tracked, to a remote user.

2 Claims, 16 Drawing Sheets

U.S. PATENT DOCUMENTS

| | | |
|---|---|---|
| 6,331,825 B1 | 12/2001 | Ladner et al. |
| 6,545,606 B2 | 4/2003 | Piri et al. |
| 6,788,200 B1 | 9/2004 | Jamel et al. |
| 6,828,908 B2 | 12/2004 | Clark |
| 6,904,341 B2 | 6/2005 | Kish et al. |
| 7,174,277 B2 | 2/2007 | Vock et al. |
| 7,218,938 B1 | 5/2007 | Lau et al. |
| 2002/0101351 A1 | 8/2002 | Lochner |
| 2003/0160732 A1 | 8/2003 | Van Heerden et al. |
| 2004/0183676 A1 | 9/2004 | Eisenman |
| 2004/0198382 A1 | 10/2004 | Wong |
| 2006/0103538 A1 | 5/2006 | Daniel |
| 2007/0013526 A1 | 1/2007 | Kazdin et al. |
| 2007/0024450 A1 | 2/2007 | Shichiku et al. |
| 2007/0069891 A1 | 3/2007 | Wallace et al. |
| 2007/0171047 A1 | 7/2007 | Goodman et al. |

OTHER PUBLICATIONS

Products of GTX Corporation, GTXC, pp. 1-2, Aug. 2, 2007, http://www.gtxcorp.com/about/products.htm.

About The GTX Corporation, GTXC, pp. 1-2, Aug. 2, 2007, http://www.gtxcorp.com/about/about.htm.

GPS Tracking at the Boston Marathon and a Regatta to Mexico using gpVector Technology by GTX Corp, pp. 1-7, Aug. 2, 2007, http://www.gtxcorp.com/press/articles/regatta-marathon.htm.

Tracking Portal—Products of GTX Corporation, GTXC—The PLS Company—Personal Location Services—Integrating GPS tra . . . , p. 1, Aug. 2, 2007, http://www.gtxcorp.com/about/product/product-tracking-portal.htm.

Device—Products of GTX Corporation, GTXC—The PLS Company—Personal Location Services—Integrating GPS tracking an . . . , p. 1, Aug. 2, 2007, http://www.gtxcorp.com/about/product/technical-specs.htm.

Platform of GTX Corporation, GTXC, p. 1, Aug. 2, 2007, http://www.gtxcorp.com/about/platform.htm.

Benefits of GTX Corporation, GTXC, pp. 1-2, Aug. 2, 2007, http://www.gtxcorp.com/about/benefits.htm.

GTXCorp License, pp. 1-3, Aug. 2, 2007, http://www.gtxcorp.com/about/license.htm.

GeoFence—Products of GTX Corporation, CTXC—The PLS Company—Personal Location Services—Integrating GPS trackin . . . , p. 1, Aug. 2, 2007, http://www.gtxcorp.com/about/product/product-geofence2.htm.

Device—Products of GTX Corporation, GTXC—The PLS Company—Personal Location Sevices—Integrating GPS tracking an . . . , p. 1, Aug. 2, 2007, http://www.gtxcorp.com/about/product/product-overview-device2.htm.

GTX Corporation, GTXC—The PLS Company—Personal Location Services—Integrating GPS tracking and transmitting techno . . . , pp. 1-2, Aug. 2, 2007, http://www.gtxcorp.com/.

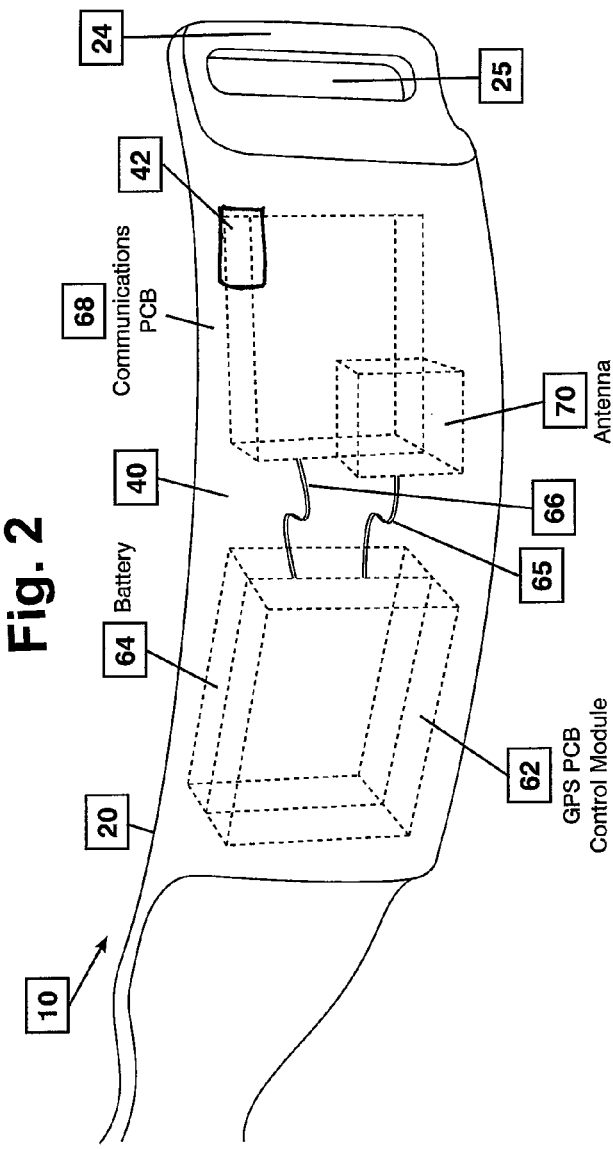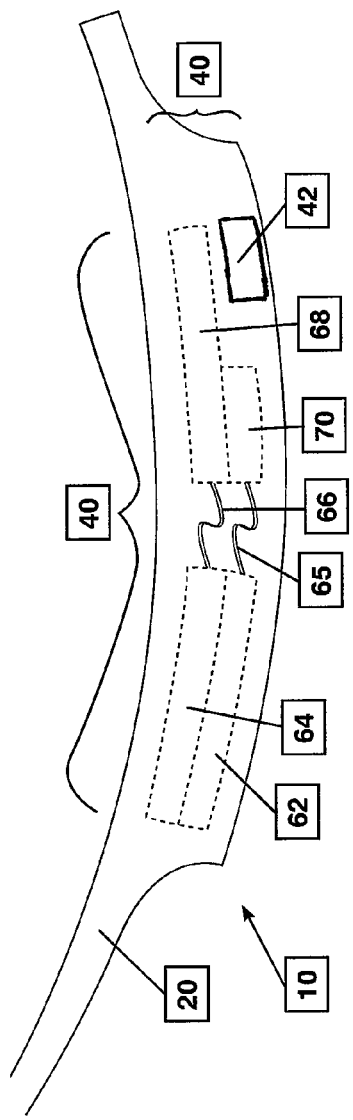

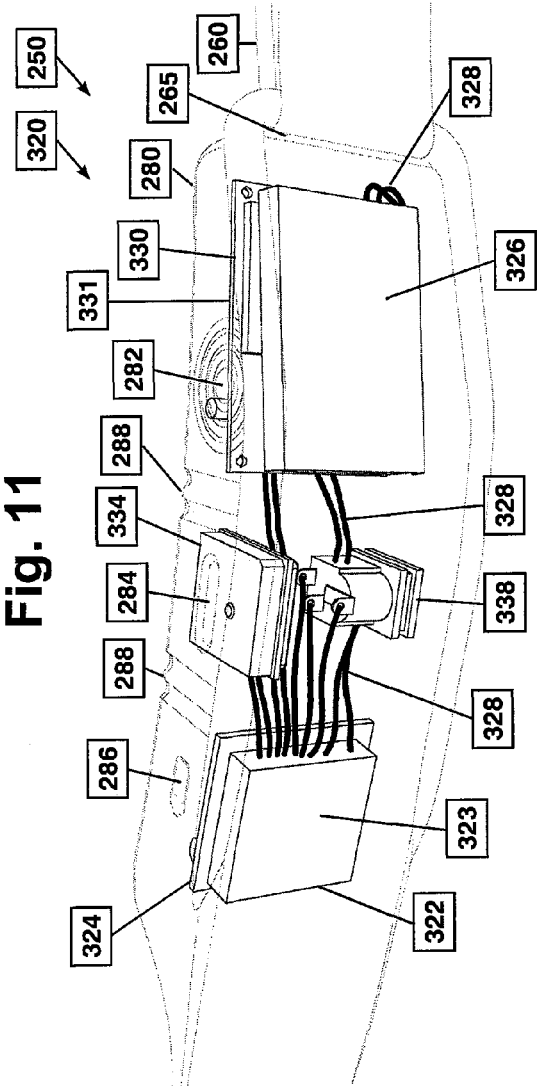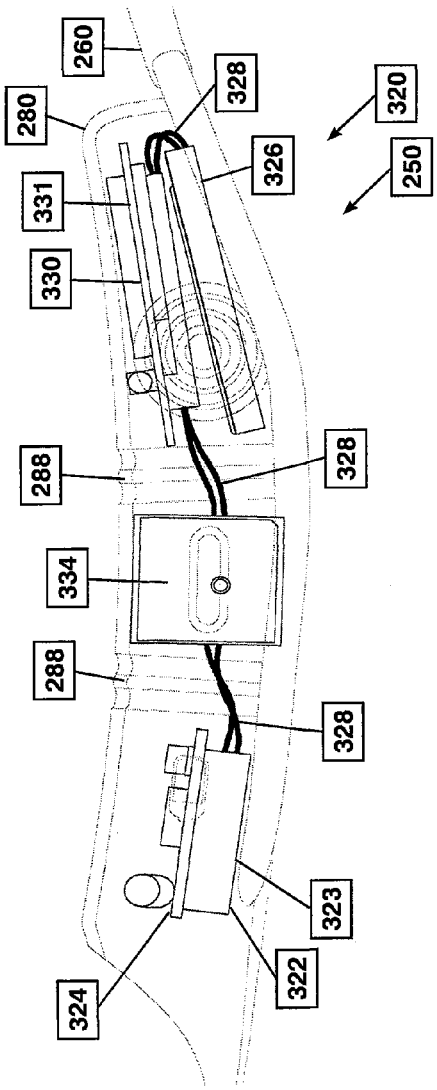

SYSTEM AND APPARATUS FOR TRACKING A PERSON OR AN ANIMAL

CROSS REFERENCE TO RELATED APPLICATION

This application claims the benefit of U.S. Provisional Patent Application Ser. No. 60/989,315 filed Nov. 20, 2007, which is incorporated herein by reference in its entirety.

BACKGROUND OF THE INVENTION

This invention relates generally to a system and apparatus for tracking a target object. More particularly, this invention relates to a system and apparatus for tracking a person or an animal using at least one of a global positioning system (GPS) satellite network, a cellular network, a radio frequency network, a telephone network, and a computer network using a multifunctional transceiver carried or mounted on or by the person or animal being tracked.

The transceiver may be configured for mounting on or integrally formed with a belt or collar worn by the person or animal being tracked. The transceiver may relay position and/or location information of the transceiver, and ultimately the person or animal being tracked, to a remote user.

SUMMARY OF THE INVENTION

One embodiment of the present invention is directed to an apparatus for tracking a person or an animal, comprising a belt. The belt may have a first end having a grip at a tail end and at least one fastener positioned on an outer surface of the belt near the tail end. The belt may have a second end having an aperture through which the first end is threaded. The belt may also have a transceiver enclosure.

The apparatus for tracking a person or an animal may also include a GPS transceiver removably mounted in the transceiver enclosure. The transceiver may include a control module for processing GPS-acquired position data. The control module may include nonvolatile memory for storing the position data. The transceiver may also include a portable, rechargeable power source connected to the control module for electrically powering the transceiver, a communications module electrically connected to the control module for receiving and transmitting the position data, a GPS antenna connected to the communications module for receiving the position data from a GPS satellite network, and a radio modem for transmitting and receiving the position data to a remote location using one of a cellular network and a wireless network.

The control module may be electrically connected to the communications module by a flexible electrical cable to permit the belt to flex both in bending and in torsion.

Another embodiment of the present invention is directed to a GPS tracking apparatus having belt with a releasable fastener for releasably securing the belt to a person or an animal. The tracking apparatus also includes a transceiver enclosure integrally formed with the belt, and a GPS transceiver integrally formed with the belt and housed in the transceiver enclosure.

The transceiver includes a control module having a CPU for processing GPS-acquired position data of the belt. The control module includes nonvolatile memory for storing the position data. The transceiver also includes a GPS antenna electrically yet flexibly connected to the control module for receiving the position data from a GPS satellite network, a communications module electrically yet flexibly connected to the control module for wirelessly transmitting the position data to at least one of a plurality of remote devices, and a portable power source electrically yet flexibly connected to the control module for electrically powering the transceiver.

The enclosure may include at least one flexible hinge, where the at least one flexible hinge is designed to enhance flexion of the enclosure so as to optimally fit the wearer of the belt. The GPS transceiver may also include a plurality of functions that are selectable on the transceiver or remotely from at least one of the plurality of remote devices. The plurality of functions may include defining a geographical area surrounding the belt, and sending an alert from one of the transceiver or a central server to at least one of the plurality of remote devices if the belt exits the geographical area.

The GPS tracking apparatus may also include a security feature comprising a flexible electrical conductor embedded in or attached to the belt where the conductor electrically connects the transceiver to a security loop on the belt. The security loop may be releasably securable over a trouser belt loop to close the electrical circuit and arm the security feature. The transceiver may be programmed to transmit an alert to at least one of the plurality of remote devices when the electrical circuit on the belt becomes open or is inoperable.

The transceiver of the GPS tracking apparatus may be programmed to transmit the position data of the belt continuously, intermittently, or at random intervals, and the position data may be transmitted via email, as a text message, or as a simulated voice communication. The communications module of the GPS tracking device may include a radio modem that transmits the position data to at least one of the plurality of remote devices using one of a cellular network, a wireless network, a public switched telephone network, or the Internet. The radio modem may include a circuit for receiving at least one of a test signal to verify a status of the apparatus, a signal to turn the transceiver on or off, a signal to cause the transceiver to enter a reduced power consumption mode or to enter a standard power consumption mode, and a signal to enter geofence mode.

The transceiver may enter a reduced power consumption mode upon the occurrence of one of: a sensor connected to the transceiver senses no motion of the belt or when a difference in measured GPS position of the belt over a predetermined time interval is within a predetermined tolerance.

The GPS position data of the belt may be transmitted to at least one of a cell phone, a PDA, a personal computer, a computer server, and a central database. The battery of the GPS transceiver may be rechargeable and may be removably replaceable in the transceiver housing. The battery may include a lithium ion battery or a lithium polymer battery. The transceiver enclosure may be waterproof.

Another embodiment of the present invention is directed to a GPS tracking apparatus having a belt configured to releasably attach to a person or an animal. The GPS tracking apparatus also includes a transceiver enclosure integrally formed with the belt, the enclosure comprising at least one flexible hinge on at least an interior surface of the enclosure for enhancing flexion of the enclosure.

The GPS tracking apparatus also includes a GPS transceiver for transmitting the GPS position of the belt to, and for receiving at least one signal from, at least one of a plurality of remote devices. The transceiver includes a control module having a CPU for processing GPS-acquired position data and nonvolatile memory for storing the position data. The transceiver also includes a GPS antenna electrically yet flexibly connected to the control module for receiving the position data from a GPS satellite network, a communications module electrically yet flexibly connected to the control module for wirelessly transmitting the position data to at least one of the plurality of remote devices, and a portable power source electrically yet flexibly connected to the control module for electrically powering the transceiver.

The transceiver automatically selects one of a plurality of pathways for transmitting the position data to at least one of the plurality of remote devices depending on a signal strength of each of the plurality of pathways. The plurality of pathways may include at least one of a cellular network, a wireless network, a public switched telephone network, and the Internet.

Another embodiment of the present invention is directed to a system for tracking a person or an animal, comprising a GPS transceiver removably mounted in a transceiver enclosure on a belt. The belt may include a control module for processing GPS-acquired position data, the control module including nonvolatile memory for storing the position data, a portable, rechargeable power source connected to the control module for electrically powering the transceiver, a communications module electrically connected to the control module for receiving and transmitting the position data, a GPS antenna connected to the communications module for receiving the position data from a GPS satellite network, and a radio modem for transmitting and receiving the position data to a remote location using one of a cellular network and a wireless network. The control module may be electrically connected to the communications module by a flexible electrical cable to permit the belt to flex both in bending and in torsion.

The system may also include a central database for collecting and storing position information received from the transceiver for later recall or retransmission to a user and a wireless network for receiving and transmitting data including the GPS-acquired data to and from the transceiver from the remote location.

In yet another embodiment, a GPS tracking system is disclosed, having a GPS transceiver integrally formed with a belt that is releasably securable to a person or an animal. The transceiver transmits GPS-acquired position data of the belt to at least a central database for collecting, storing, and retransmitting the position data to a consumer. The GPS tracking system also includes a subscription service provider that operates the central database and retransmits the position data from the central database to at least one of a plurality of remote devices according to a subscription level purchased by the consumer. Retransmittal of the position data from the central database may occur over at least one of a wireless network, a cellular network, a public switched telephone network, and the Internet. The plurality of remote devices receiving the retransmission may include at least one of a personal computer, a cell phone, a PDA, a facsimile machine, an answering machine, and a landline telephone to enable a consumer to remotely track a person or animal wearing the belt.

A better understanding of the objects, advantages, features, properties and relationships of the invention will be obtained from the following detailed description and accompanying drawings which set forth illustrative embodiments that are indicative of the various ways in which the principles of the invention may be employed.

BRIEF DESCRIPTION OF THE DRAWINGS

For a better understanding of the invention, reference may be had to preferred embodiments shown in the following drawings in which:

FIG. 2 illustrates a partial perspective view of the embodiment shown in FIG. 1;

FIG. 3 illustrates a partial top plan view of the embodiment shown in FIG. 1;

FIG. 11 illustrates a partial perspective view of the embodiment shown in FIG. 10;

FIG. 12 illustrates a partial top plan view of the embodiment shown in FIG. 10;

FIG. 15 illustrates a partial bottom perspective view of the embodiment shown in

FIG. 10;

DETAILED DESCRIPTION

Figure 1:
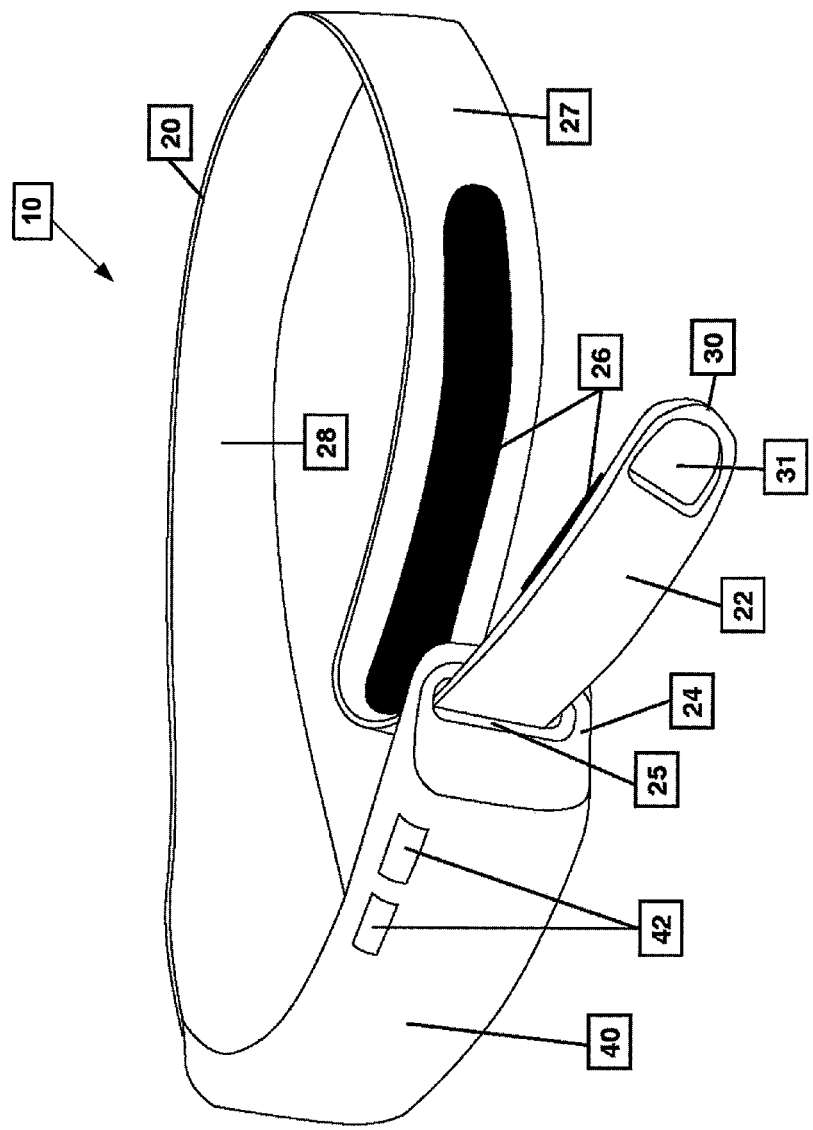
FIG. 1 illustrates a front perspective view of one embodiment of the present invention.

While this invention is susceptible of embodiments in many different forms, there is shown in the drawings and will herein be described in detail, a preferred embodiment of the invention with the understanding that the present disclosure should be considered as an exemplification of the principles of the invention and is not intended to limit the broad aspects of the invention to the embodiments illustrated herein.

Turning now to the figures, wherein like reference numerals refer to like elements, there is illustrated in FIGS. 1-6 tracking apparatus 10 incorporating the improvements of the present invention. FIG. 1 illustrates, for example, tracking apparatus 10 comprising belt 20. Belt 20 may include first end 22 and second end 24. Second end 24 may include aperture 25 to permit male end 22 to be threaded through aperture 25. First end 22 may include grip 30 and aperture 31 to permit easy and effortless manipulation of first end 22.

As shown in FIG. 1, first end 22 may also include fastener 26 positioned along outer surface 27 of belt 20. Fastener 26 may comprise a hook and loop type fastener, as shown in the FIG. 1. Alternatively, or additionally, fastener 26 may comprise any known releasable fastener, such as a buckle, one or more buttons, one or more snaps, or one or more high strength magnets, and the like, or any combination of these fasteners. It should be understood that other fasteners may be employed instead of or in addition to fastener 26 so long as such fasteners are capable of releasably securing belt 20 to target object 210.

Belt 20 may be made of any commonly used materials, such as leather, nylon or any other fabric or weave, rubber including urethane rubber, or injection molded plastic. In addition, belt 20 may be configured for wearing around a person's waist, for example. Alternatively, belt 20 may be configured as an animal collar.

Tracking apparatus 10 may also comprise multifunctional transceiver 60 for communicating and/or reporting the location and/or position of target object 210, such as a person or an animal, to be tracked. Target object 210 may be a human child or adult. Alternatively, target object 210 may be an animal, such as a pet, a farm animal, or a wild animal.

As best shown in FIGS. 2-3, transceiver 60 may be housed or mounted in transceiver housing 40 of belt 20. Transceiver 60 may be optionally configured for mounting on or in belt 20, or alternatively, on such substrates such as elastic (such trouser suspenders), book bags or book bag straps, or even certain clothing. Transceiver 60 may be removably mounted on belt 20 or on any of the above-mentioned substrates depending on the packaging design of transceiver 60 and of transceiver housing 40.

As shown in FIGS. 2-3, transceiver 60 may include the following components to receive and transmit position and/or location information of target object 210: transceiver control module 62 comprising a printed circuit board, battery 64, communications module 68 comprising a printed circuit board, and antenna 70. One or more indicators 42, such as one or more light emitting diodes (LED's) or one or more digital readout panels, such as LCD displays, may be positioned on outer surface 27 and/or inner surface 28 of belt 20. Indicators 42 may be configured to provide an indication to the wearer of belt 20 or to an observer next to the wearer of belt 20 of the remaining life of battery 64, the status of transceiver 60, and the selection of programmed features of transceiver 60, for example.

Transceiver control module 62 may include a GPS chipset for obtaining the actual, physical location of transceiver 60 on the Earth from, for example, GPS network 220. The GPS chipset may forward location information to a motherboard and CPU for further processing of additional functional parameters, such as, for example, to determine the speed of travel of target object 210 while being tracked. The CPU may be a RISC-style 8-bit microprocessor chip with flash memory, such as Microchip PIC 18LF2525.

Communications module 68 may comprise a radio modem for sending or receiving location and/or position data to and from a cellular or other wireless network. Location and/or position data may also be received by antenna 70, which may be configured to receive GPS location and/or position signals from a GPS satellite. GPS location and/or position data received by antenna 70 may be processed by transceiver control module 62 and transmitted by communications module 68 to a cellular or other wireless network for ultimate receipt by a central database 240 (see FIG. 10).

Communications module 68 may be electrically connected to transceiver control module 62 via one or more flexible electrical conductors or cables 66, which may comprise one or more electric ribbon cables. One or more cables 66 may provide flexibility in locating and/or placing transceiver control module 62 relative to communications module 68 when transceiver 60 is housed or mounted in transceiver housing 40. Consequently, transceiver control module 62 and communications module 68 may comprise different printed circuit boards and be separated from one another by the selected length of the one or more cables 66 to permit flexibility in both the overall size and/or footprint of transceiver 60 and of the mounting of transceiver 60 onto or in a substrate, such as belt 20. In addition, use of one or more cables 66 to electrically connect various modules of transceiver 60 to one another may provide substantial torsional and bending flexibility of belt 20 because the one or more cables 66 may permit communications module 68 to move relative to transceiver control module 62. In this way, various components and/or modules of transceiver 60 may be strung together via one or more cables 66 to provide limitless packaging flexibility of transceiver 60.

Such flexibility of the various components of transceiver 60 through one or more cables 66 may be advantageous for use in connection with small diameter belts and collars. For example, a child's trouser belt or a dog collar may be relatively small in circumference and diameter. By employing the improvements of the present invention to a small diameter belt, a tracking apparatus, such as tracking apparatus 10, including belt 20, may be deployed to track a small child or a small animal, such as a pet. In one embodiment, flexibility of belt 20 is enhanced through choice of a flexible material from which transceiver housing 40 and/or belt 20 are made, miniaturization of transceiver 60, through incorporation of flexible electrical conductors or cables 65,66, or any combination of these.

Antenna 70 may be connected to and extend from transceiver control module 62 via cable 65, rather than be mounted on transceiver control module 62, so as to permit flexibility in placing antenna 70 in the best possible location to avoid radio frequency and/or magnetic interference. As shown in FIGS. 2-3, antenna 70 may be mounted adjacent communications module 68 to minimize the overall thickness of transceiver 60. Because length of cable 65 may be any length, antenna 70 may be positioned as may be dictated by packaging considerations as well as interference considerations. Alternatively, antenna 70 may be directly mounted on communications module 68.

Battery 64 may be a single use battery. Optionally, battery 64 may be configured as a rechargeable battery, and may be recharged with battery 64 mounted on belt 20 or demounted from belt 20. A suitable rechargeable battery may include, for example, a lithium ion battery or a lithium polymer battery.

Figure 4:
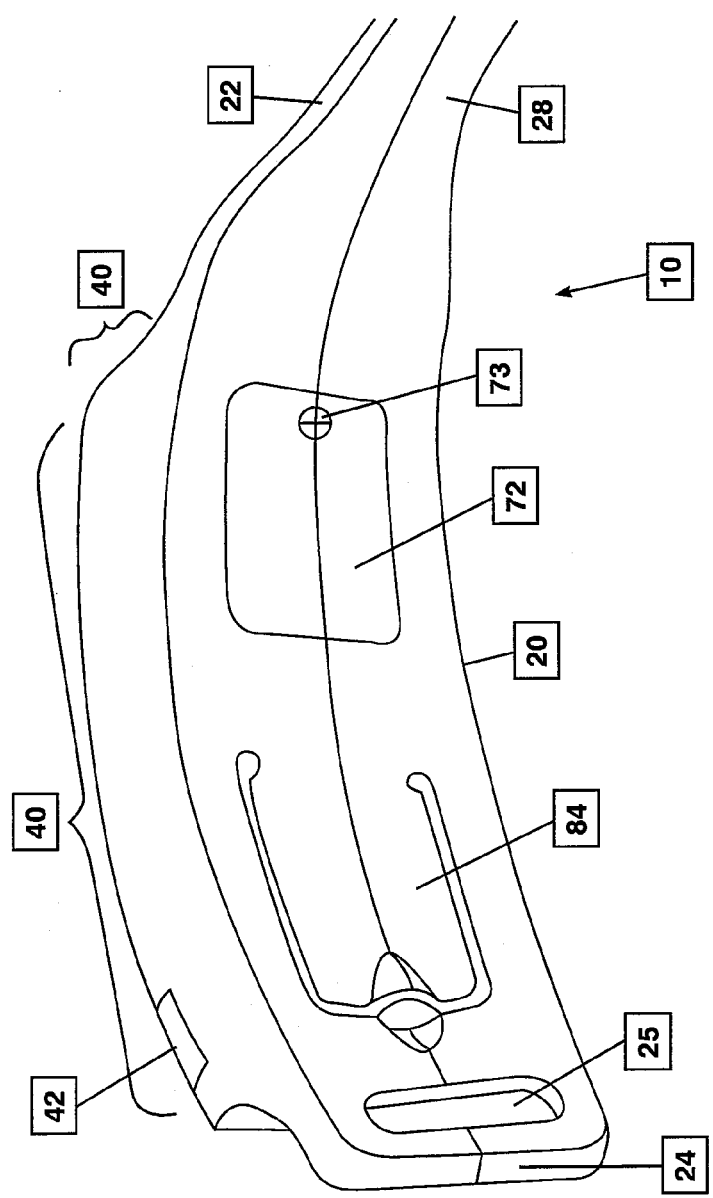
FIG. 4 illustrates a partial rear perspective view of the embodiment shown in FIG. 1.
Figure 5:
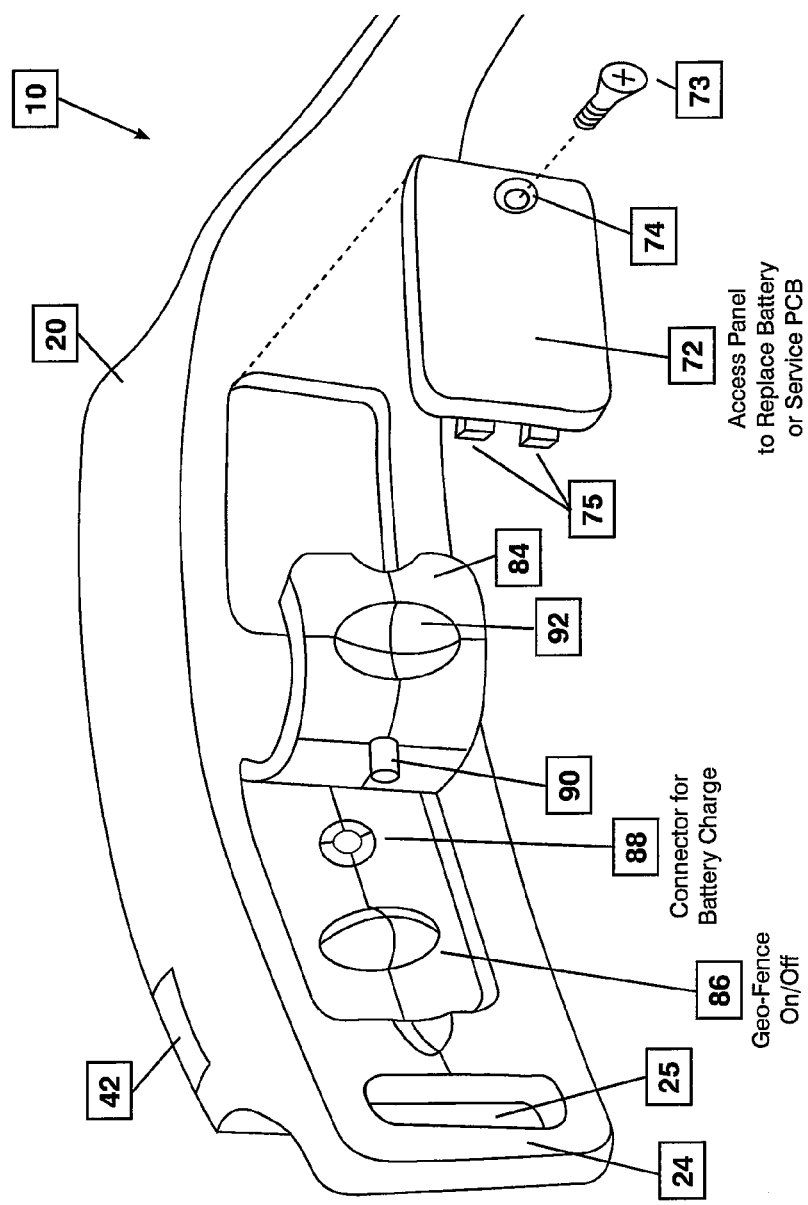
FIG. 5 illustrates an exploded, partial rear perspective view of the embodiment shown in FIG. 1.

Referring to FIG. 4, access to battery 64 to remove and replace battery 64 may be accomplished through access panel 72 located along inner surface 28 of belt 20. Access panel 72 may be configured to lay flush with inner surface 28 of belt 20. In addition, access panel 72 may be secured to belt 20 using one or more fasteners 73. The connection of access panel 72 to belt 20 may be configured to be water resistant. As best shown in FIG. 5, access panel 72 may also comprise one or more tabs 75 for interlocking access panel 72 to belt 20. Access panel 72 may be completely or partially removable from, and reinsertable into, belt 20.

Referring again to FIG. 4, panel 84, which is located along inner surface of belt 20, provides coverage of and access to battery recharging port 88 and actuator 86. Panel 84 may be configured to lay flush with inner surface 28 of belt 20. The connection of panel 84 to belt 20 may be configured to be water resistant. As shown in FIG. 4, panel 84 may be configured for partially peeling back to expose battery recharging port 88 and actuator 86 or any other feature or actuators that may exist behind panel 84. Optionally, panel 84 may be configured to be completed removable and reinsertable on belt 20.

Panel 84 may include post 90, which may be positioned on the inside wall of panel 84 to further protect battery recharging port 88 and actuator 86 from incidental actuation and/or water or debris infiltration. Panel 84 may also include one or more buttons 92, which may be positioned on the inside wall of panel 84. Button 92 may be configured both as a protective cover for actuator 86 and to actuate actuator 86. Actuation of actuator 86 may be performed by a user pressing on button 92 on panel 84 or by directly pressing on exposed actuator 86. In so doing, various functions modes of operation of transceiver 60, such as standard tracking mode or geofence tracking mode, may be selected, activated, or deactivated. Transceiver 60 may be configured to respond to activation of button 92 by a user to activate one or more features of transceiver 60 or simply to turn on or off transceiver 60.

Transceiver 60 may include one or more buttons 92 to access or activate one or more features of transceiver 60, and each may be positioned separately or as a cluster on belt 20, depending on various ergonomic, packaging, and security considerations, for example. Transceiver 60 may be programmed to respond to a particular security code that a user enters using one or more buttons 92, such as by flashing the one or more indicators 42 in a predetermined sequence, or by including a keypad on belt 20 through which a user may enter a numerical, alphabetic, or alpha-numeric password or code. Transceiver 60 may also be unlocked remotely by a user entering the security code in an Internet web page, for example.

Belt 20 may be worn on one's waist by target object 210 as a primary belt on one's waist to support one's trouser's, or belt 20 may be worn in addition to a first belt worn by target object 210 to supplement the first belt. Similarly, belt 20 may be configured as an animal collar and worn by the animal (i.e., target object 210) either by itself or with one or more other collars.

Figure 6:
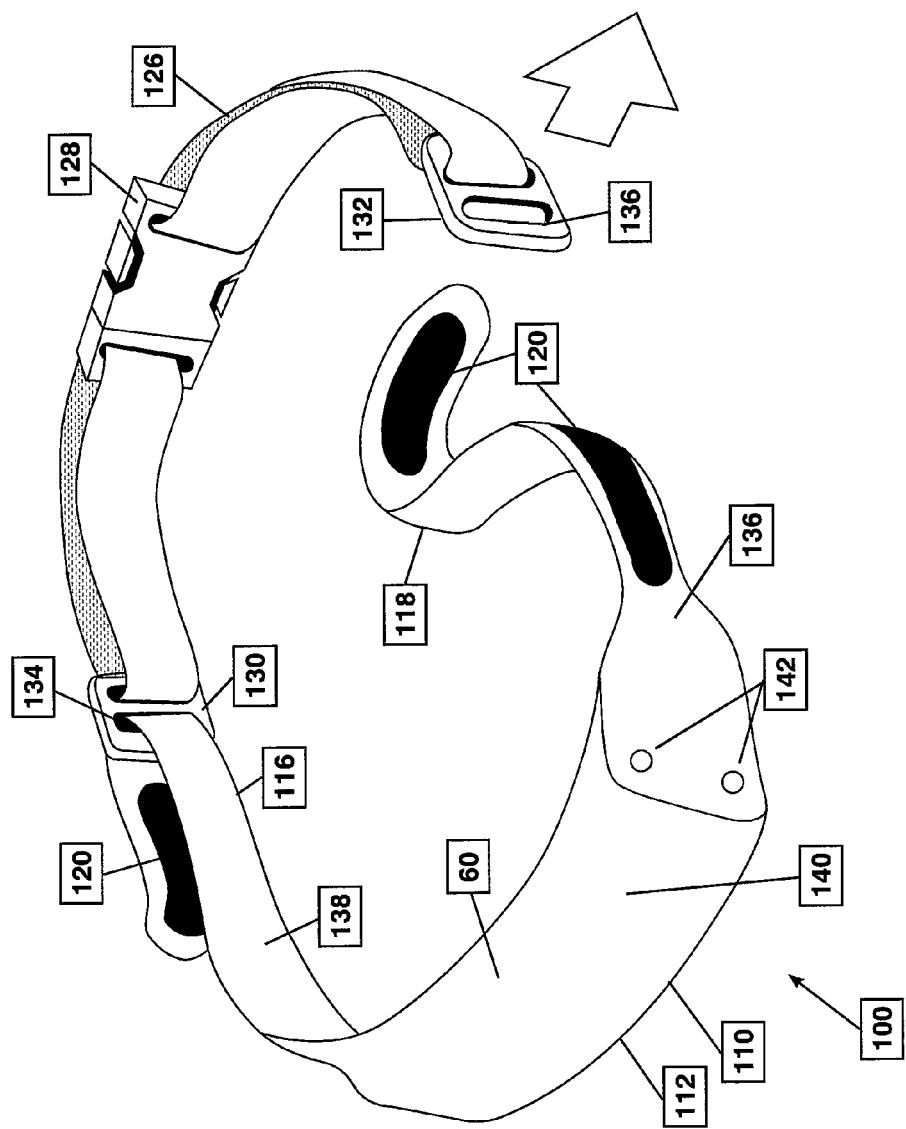
FIG. 6 illustrates a perspective view of another embodiment of the present invention.
Figure 7:
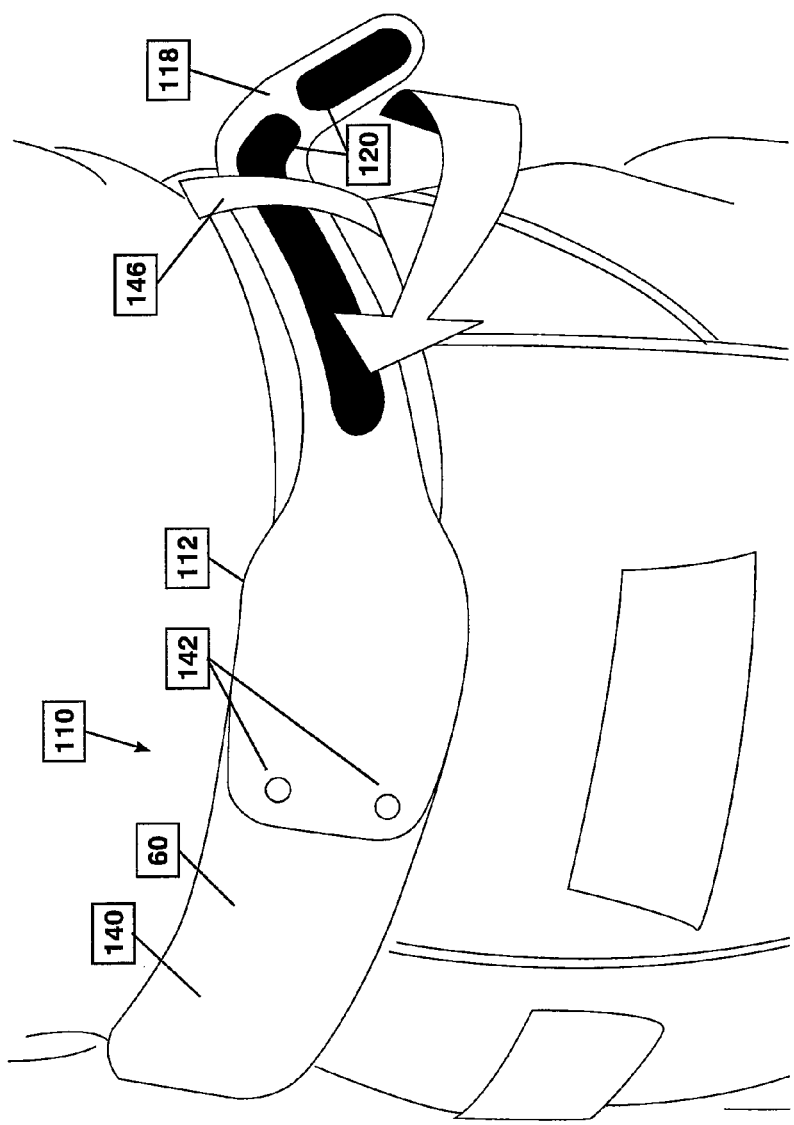
FIG. 7 illustrates a partial perspective view of one aspect of the embodiment shown in FIG. 6.
Figure 8:
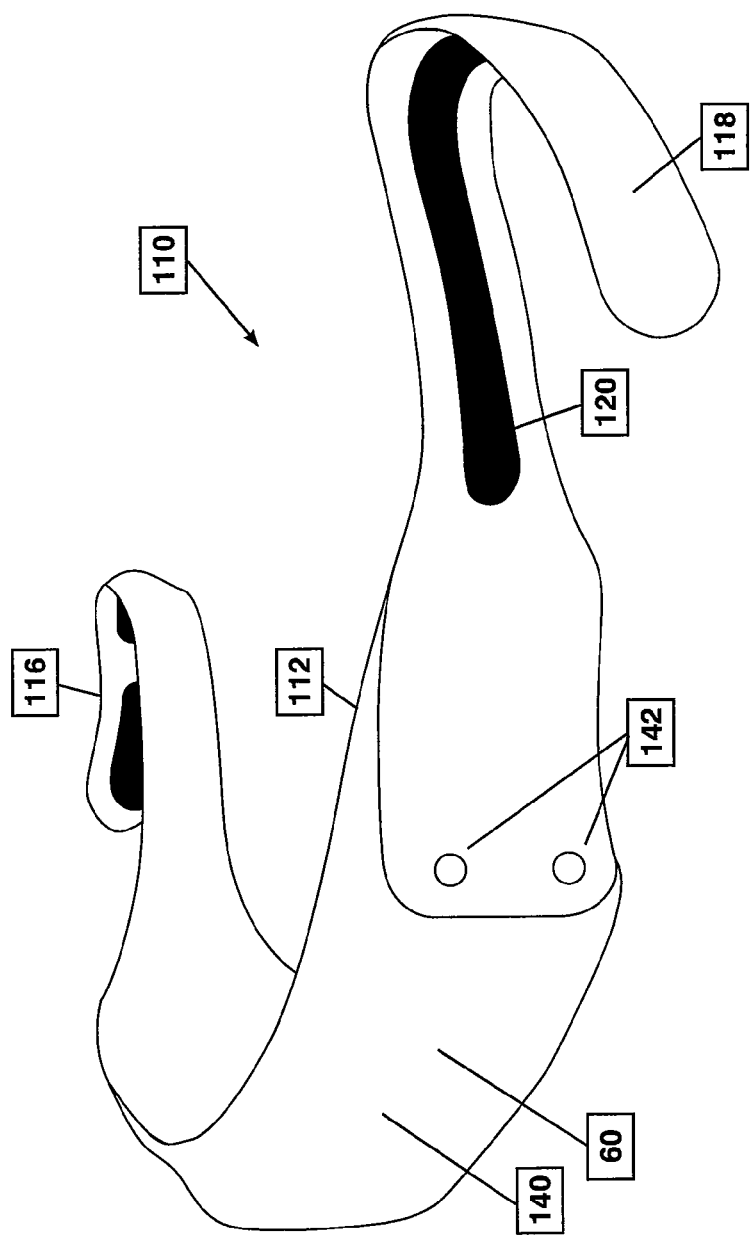
FIG. 8 illustrates another partial perspective view of one aspect of the embodiment shown in FIG. 6.

Another embodiment of the present invention is shown in FIGS. 6-8. FIG. 6, for example, shows tracking apparatus 100, which differs from tracking apparatus 10 mainly in the configuration of belt 110 as compared to belt 20. For example, belt 110 may comprise a substantially two-piece structure to provide flexibility in securing belt 110 to target object 210. More specifically, belt 110 may be worn by target object 210 as a 2-piece unit, as shown in FIG. 6, or belt 110 may be worn by target object 210 as a one-piece unit, as shown in FIGS. 7-8. In the latter configuration, belt 110 may be inserted through and secured over a pair of belt loops on a pair of trousers worn by target object 210.

If target object 210 is an animal, and depending on the circumference of the animal's neck and over length of belt 110 in the one-piece configuration, loose ends 116, 118 of belt 110 may be secured around the animal's neck using fastener 120 to form a tracking collar. Fastener 120 may be positioned on inside and outside surfaces of belt 110 to accommodate fastening belt 110 in the one-piece unit configuration around an animal's neck, as well as to accommodate using belt 110 in the 2-piece configuration described above. Fastener 120 may comprise a hook and loop type fastener, as shown in FIGS. 7-8. Alternatively, or additionally, fastener 120 may comprise any known releasable fastener, such as a buckle, one or more buttons, one or more snaps, or one or more high strength magnets, and the like, or any combination of these fasteners. It should be understood that other fasteners may be employed instead of or in addition to fastener 120 so long as such fasteners are capable of releasably securing belt 110 to target object 210.

As shown in FIG. 6, belt 110 may comprise forward end 126 and rear end 112. Forward end 126 may include buckle 128 and connector ends 130, 132 for attaching rear end 112 to forward end 126. As describe above, rear end 112 may include loose ends 116, 118, which may be configured to be threaded through apertures 134, 136 of connector ends 130, 132. Like belt 20, belt 110 may be made of any commonly used materials, such as leather, nylon or any other fabric or weave, rubber including urethane rubber, or injection molded plastic.

Referring to FIGS. 6-8, similar to tracking apparatus 10, tracking apparatus 100 may comprise multifunctional transceiver 60 for communicating and/or reporting the location and/or position of target object 210. Transceiver 60 of tracking apparatus 100 may be removably mounted to belt 110 in much the same manner as belt 20. For example, transceiver 60 may be housed or mounted in transceiver housing 140 of belt 110. Similarly, access to the various components or modules of transceiver 60, such as battery 64, may be made available to a user of tracking apparatus 100 in much the same way as previously shown and described in FIGS. 4-5. One or more one or more indicators 142, such as one or more light emitting diodes (LED's) may be positioned on outer surface 136 and/or inner surface 138 of belt 110. Alternatively, indicators 142 may comprise one or more digital readout panels, such as LCD displays. Whatever the form indicators 142 may take, indicators 142 may be configured to provide an indication to the wearer of belt 110 or to an observer next to the wearer of belt 110 of the remaining life of battery 64, the status of transceiver 60, and the selection of programmed features of transceiver 60, for example. Thus, the configuration options of belt 110 with respect to transceiver 60 are the same as for belt 20.

Figure 9:
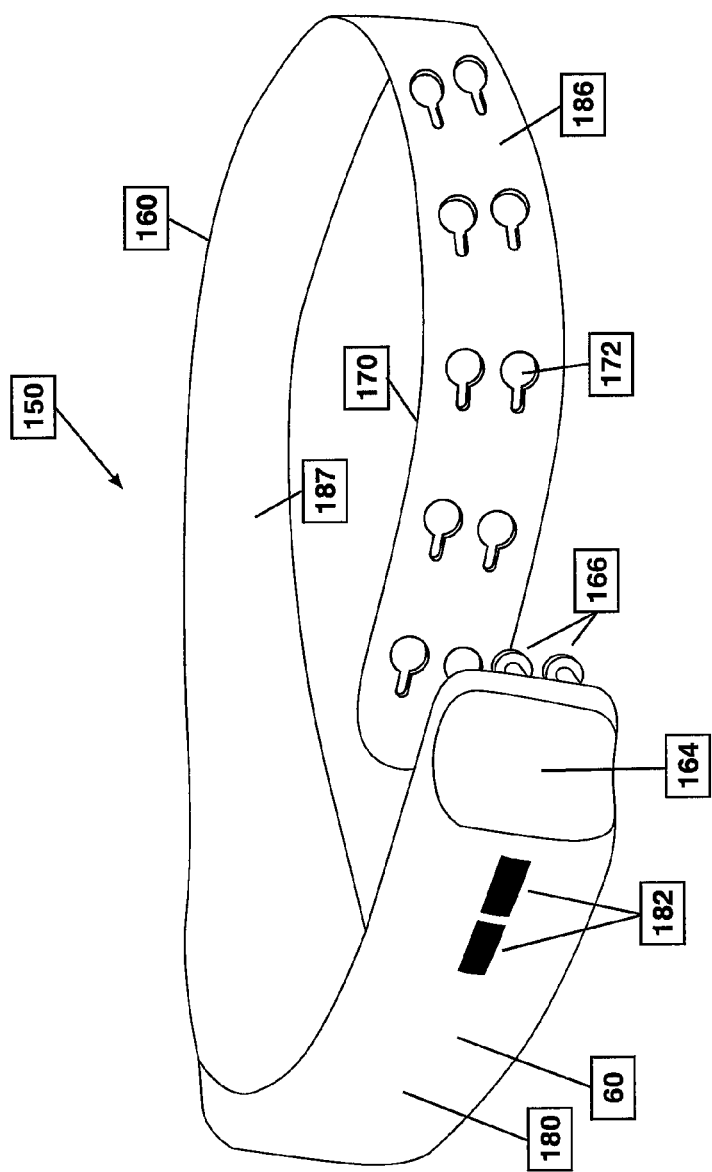
FIG. 9 illustrates a perspective view of yet another embodiment of the present invention.

Yet another embodiment of the present invention is shown in FIG. 9 as tracking apparatus 150. Tracking apparatus 150 may comprise belt 160, which is similar to belt 20 except for the manner in which the ends of the belt are connected together while in use. For example, belt 160 may include first end 164 and second end 170. First end 164 may include one or more pins 166 configured for removable insertion and capture by one or more locking receptacles 172 positioned along second end 170. Like belt 20, belt 160 may be made of any commonly used materials, such as leather, nylon or any other fabric or weave, rubber including urethane rubber, or injection molded plastic.

Like the previously described embodiments, tracking apparatus 150 may comprise multifunctional transceiver 60 for communicating and/or reporting the location and/or position of target object 210. Transceiver 60 of tracking apparatus 150 may be removably mounted to belt 160 in much the same manner as belt 20. For example, transceiver 60 may be housed or mounted in transceiver housing 180 of belt 160. Similarly, access to the various components or modules of transceiver 60, such as battery 64, may be made available to a user of tracking apparatus 150 in much the same way as previously shown and described above.

As shown in FIG. 9, one or more one or more indicators 182, such as one or more light emitting diodes (LED's) may be positioned on outer surface 186 and/or inner surface 187 of belt 160. Alternatively, indicators 182 may comprise one or more digital readout panels, such as LCD displays. Whatever the form indicators 182 may take, indicators 182 may be configured to provide an indication to the wearer of belt 160 or to an observer next to the wearer of belt 160 of the remaining life of battery 64, the status of transceiver 60, and the selection of programmed features of transceiver 60, for example. Thus, the configuration options of belt 160 with respect to transceiver 60 are the same as for belt 20.

Figure 10:
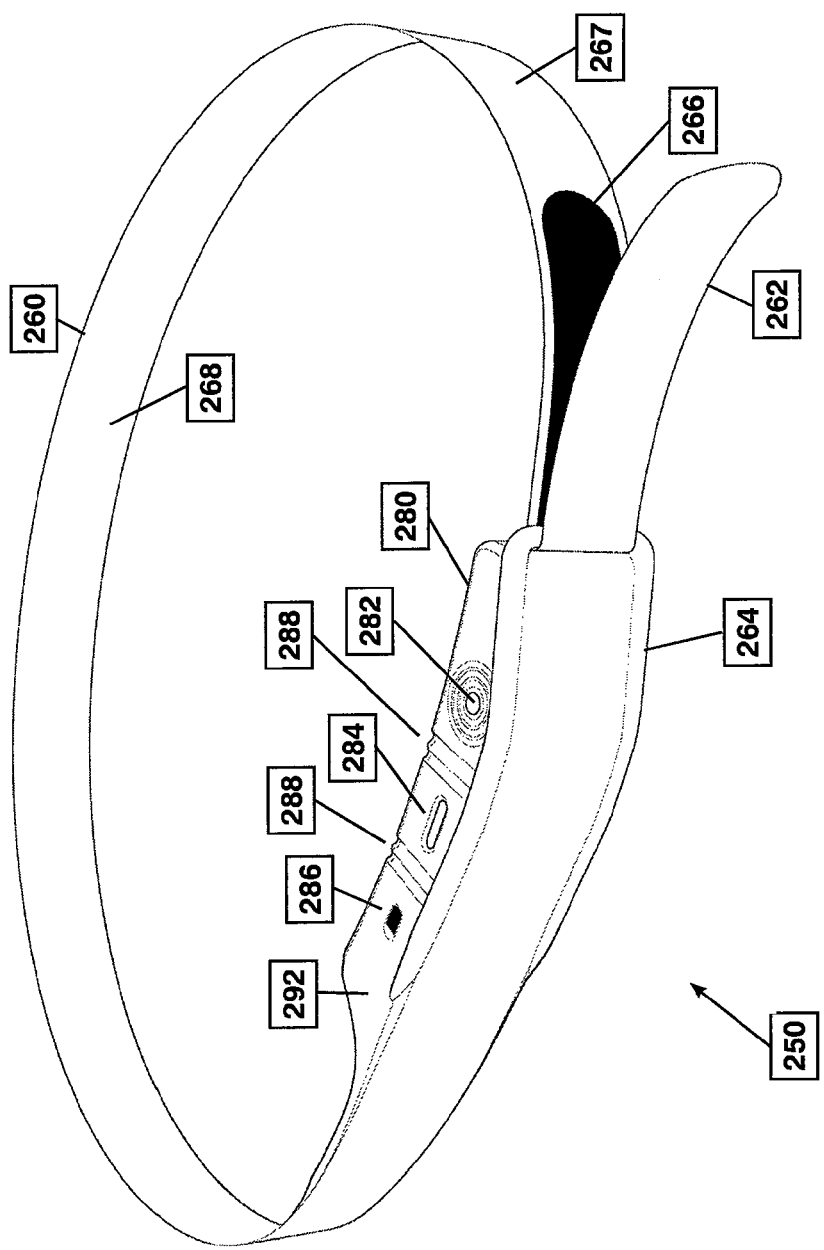
FIG. 10 illustrates a perspective view of another embodiment of the present invention.

Another embodiment of the present invention is shown in FIGS. 10-17. FIG. 10, for example, shows tracking apparatus 250 comprising belt 260. Belt 260 may include first end 262 and second end 264. Belt 260 may include aperture 265 through which second end 264 may be threaded.

A shown in FIG. 10, first end 262 may also include fastener 266 positioned along outer surface 267 of belt 260. Fastener 266 may comprise a hook and loop type fastener, as shown in FIG. 10. Alternatively, or additionally, fastener 266 may comprise any known releasable fastener, such as a buckle, one or more buttons, one or more snaps, or one or more high strength magnets, and the like, or any combination of these fasteners. It should be understood that other fasteners may be employed instead of or in addition to fastener 266 so long as such fasteners are capable of releasably securing belt 260 to target object 210.

Belt 260 may be made of any commonly used materials, such as leather, nylon or any other fabric or weave, rubber including urethane rubber, or injection molded plastic. In addition, belt 260 may be configured for wearing around a person's waist, neck, or limb, such as a wrist or ankle, for example. Alternatively, belt 260 may be configured as an animal collar.

Tracking apparatus 250 may also comprise multifunctional transceiver 320 for communicating and/or reporting the location and/or position of target object 210, such as a person or an animal, to be tracked.

As best shown in FIGS. 11-12, transceiver 320 may be housed in transceiver housing 280 of belt 260. In one embodiment, transceiver 320 is integrally formed with belt 260, as may be obtained through injection molding, for example. Transceiver 320 may be optionally packaged for separately mounting on or in belt 260, or alternatively, on such substrates such as elastic (such trouser suspenders), book bags or book bag straps, or even certain clothing. If not integrally formed with belt 260, transceiver 320 may be removably mounted on belt 260 or on any of the above-mentioned substrates depending on the packaging design of transceiver 320 and of transceiver housing 280.

As shown in FIGS. 11-12, transceiver 320 may include the following components to receive and transmit position and/or location information of target object 210: transceiver control module 322 comprising printed circuit board 324, battery 326, communications module 330 comprising printed circuit board 331, and antenna 334. One or more indicators 282 and 286, such as one or more light emitting diodes (LED's) or one or more digital readout panels, such as LCD displays, may be positioned on top surface 292 of transceiver housing 280, or on any other surface of belt 260, such as on outer surface 267 and/or inner surface 268 of belt 260. Indicators 282 and/or 286 may be configured to provide an indication to the wearer of belt 260 or to an observer next to the wearer of belt 260 of the remaining life of battery 326, the status of transceiver 320, and/or the selection of programmed features of transceiver 320, for example. In one embodiment, indicators 282 and 286 are connected to transceiver control module 322 and/or communications module 330 using a fiber optic cable.

Transceiver 320 may also include a speaker connected to transceiver control module 322 for broadcasting audible information or voice messages to a wearer of belt 260. Such audible information or voice messages may comprise confirmation of selections entered into transceiver 320, whether from the wearer of belt 260 or from a remote user. The speaker may also be connected to a 2-way radio circuit, a cellular telephone circuit, or a wireless radio (Wi-Fi) circuit, possibly together with a microphone, in transceiver 320 to permit voice communication between the wearer of belt 260 and a remote user using a remote computer, a cell phone, or a landline telephone, for example.

Transceiver control module 322 may include GPS chipset 323 for obtaining the actual, physical location of transceiver 320 on the Earth from, for example, GPS network 220. GPS chipset 323 may forward location information to printed circuit board 324 comprising a CPU for further processing of additional functional parameters, such as, for example, to determine the speed of travel of target object 210 while being tracked. The CPU may be a RISC-style 8-bit microprocessor chip with flash memory, such as Microchip PIC 18LF2525.

Communications module 330 may comprise printed circuit board 331 having a radio modem for sending or receiving location and/or position data to and from a cellular or other wireless network. Location and/or position data may also be received by antenna 334, which may be configured to receive GPS location and/or position signals from a GPS satellite. GPS location and/or position data received by antenna 334 may be processed by transceiver control module 322 and transmitted by communications module 330 to a cellular or other wireless network for ultimate receipt by a central database 240 for processing by a service provider of a subscription service (see FIG. 18).

Communications module 330 may be electrically connected to transceiver control module 322 via one or more flexible electrical conductors or cables 328, which may comprise one or more electric ribbon cables. One or more cables 328 may provide flexibility in locating and/or placing transceiver control module 322 relative to communications module 330 when transceiver 320 is housed, mounted, or integrally installed or molded with transceiver housing 280. Consequently, transceiver control module 322 and communications module 330 may comprise different printed circuit boards and be separated from one another by the selected length of the one or more cables 328 to permit flexibility in both the overall size and/or footprint of transceiver 320 and of the mounting of transceiver 320 onto or in a substrate, such as belt 260. In addition, use of one or more cables 328 to electrically connect various modules of transceiver 320 to one another may provide substantial torsional and bending flexibility of belt 260 because the one or more cables 328 may permit communications module 330 to move relative to transceiver control module 322. In this way, various components and/or modules of transceiver 320 may be strung together via one or more cables 328 to provide limitless packaging flexibility of transceiver 320.

To permit maximum bending, torsion, and/or resiliency of belt 260, transceiver housing 280 and/or belt 260 may include integrally fabricated, flexible hinges 288 on inside surface 294, top surface 292, and/or bottom surface 293, as shown in FIGS. 11-12. Flexible hinges 288 may comprise accordion-like baffles that permit flexion of transceiver housing 280 while maintaining water resistant or waterproof properties of transceiver housing 280. Such flexibility of transceiver housing 280 and/or belt 260, whether through choice of a flexible material from which transceiver housing 280 and/or belt 260 are made, incorporation of flexible hinges 288, miniaturization of transceiver 320, through one or more flexible electrical conductors or cables 328, or any combination of these, may be especially advantageous for use in connection with small diameter belts and collars. For example, a child's trouser belt or a dog collar may be relatively small in circumference and diameter thereby requiring that belt 260, including transceiver housing 280 and transceiver 320, be permitted to bend to a relatively small radius to conform, for example, to a child's small waist. As transceiver electronics become more miniaturized in the future, the need for transceiver housing 280 to bend diminishes until transceiver 320 is so small that it can be integrated directly into clothing without being obtrusive. By employing the improvements of the present invention to a small diameter belt, a tracking apparatus, such as tracking apparatus 250, including belt 260, may be deployed to track a small child or a small animal, such as a pet.

Antenna 334 may be connected to transceiver control module 322 via cable 328 so as to permit flexibility in placing antenna 334 in the best possible location to avoid radio frequency and/or magnetic interference. As shown in FIGS. 11-12, antenna 334 may be mounted between transceiver control module 322 and communications module 330 to minimize the overall thickness of transceiver 320. Because length of cable 328 may be any length, antenna 334 may be positioned as may be dictated by packaging considerations as well as interference considerations. Alternatively, antenna 334 may be directly mounted on transceiver control module 322 or communications module 330.

Battery 326 may be a single use battery. Optionally, battery 326 may be configured as a rechargeable battery, and may be recharged with battery 326 mounted on belt 260 or demounted from belt 260. A suitable rechargeable battery may include, for example, a lithium ion battery or a lithium polymer battery. In one embodiment, battery 326 is connected to communications module 330 via cable 328.

Figure 13:
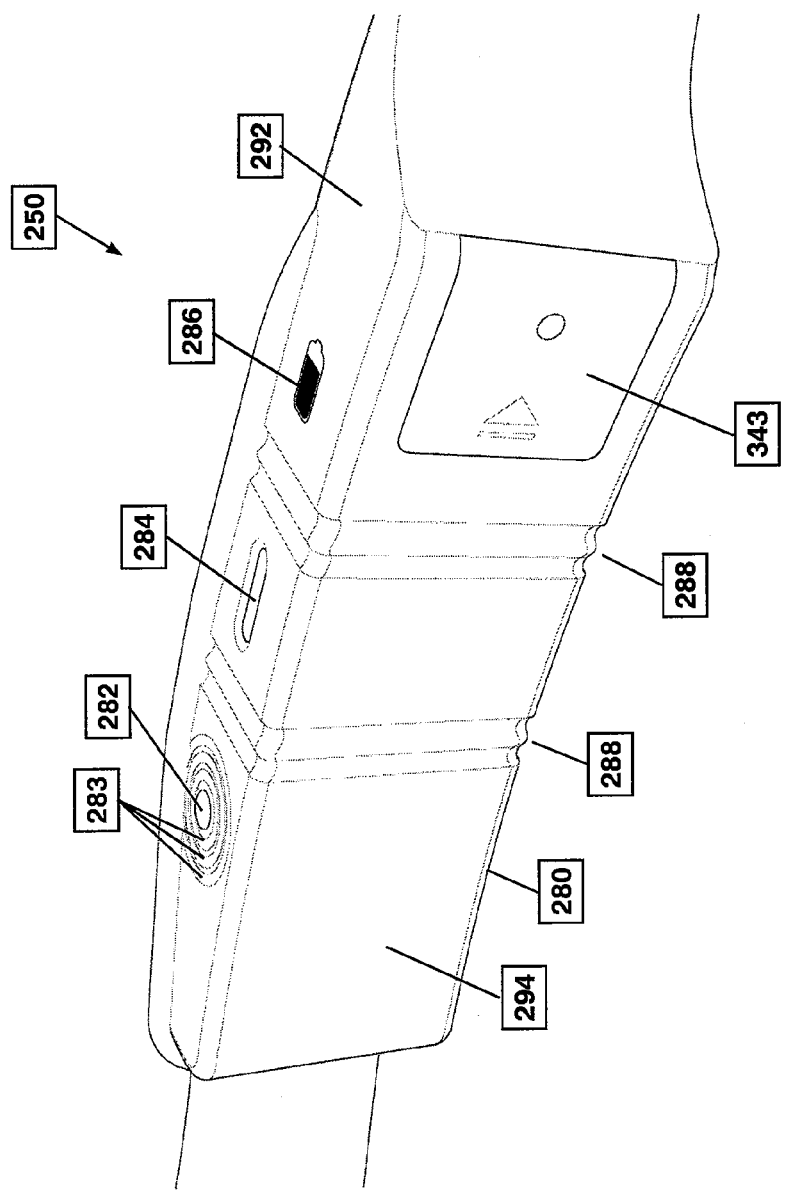
FIG. 13 illustrates a partial rear perspective view of the embodiment shown in FIG. 10.

Referring to FIG. 13, access to battery 326 to remove and replace battery 326 may be accomplished through access panel 343 located along inner surface 294 of transceiver housing 280. Access panel 343 may be configured to lay flush with inner surface 294 of transceiver housing 280. Access panel 343 may be completely or partially removable from, and reinsertable into, transceiver housing 280. In addition, access panel 343 may be secured to transceiver housing 280 using any number of known techniques, including using one or more fasteners 73 (as shown in FIG. 5). As shown in FIG. 13, access to battery 326 through access panel 343 may comprise sliding access panel 343 toward one side or the other. The connection of access panel 343 to transceiver housing 280 may be configured to be water resistant or waterproof by incorporating, for example, a waterproof gasket between access panel 343 and transceiver housing 280.

As shown in FIG. 13, transceiver 320 may include one or more user input devices or actuators 284 for a user to program, access or activate one or more features of transceiver 320, and each may be positioned separately or as a cluster on belt 260, depending on various ergonomic, packaging, and security considerations, for example. By pressing one or more actuators 284, various functions or modes of operation of transceiver 320, such as standard tracking mode or geofence tracking mode, may be selected, activated, or deactivated. Transceiver 320 may be configured to respond to activation of one or more actuators 284 by a user to activate one or more features of transceiver 320 or simply to turn on or off transceiver 320. One or more actuators 284 may also be programmed to initiate an emergency SOS message to police, fire, or rescue personnel, or to any other recipient, such as the central office of a service provider, as may be programmed in transceiver 320, and may be communicated to the recipient via email, text, voice, or other known means. One or more actuators 284 may be configured to be water resistant or waterproof.

Transceiver 320 may be programmed to respond to a particular security code that a user enters using one or more actuators 284, such as by flashing indicator 282, for example, in a predetermined sequence, or by including a keypad on belt 260 through which a user may enter a numerical, alphabetic, or alpha-numeric password or code. Transceiver 320 may also be unlocked remotely by a user entering the security code in an Internet web page, for example.

Figure 14:
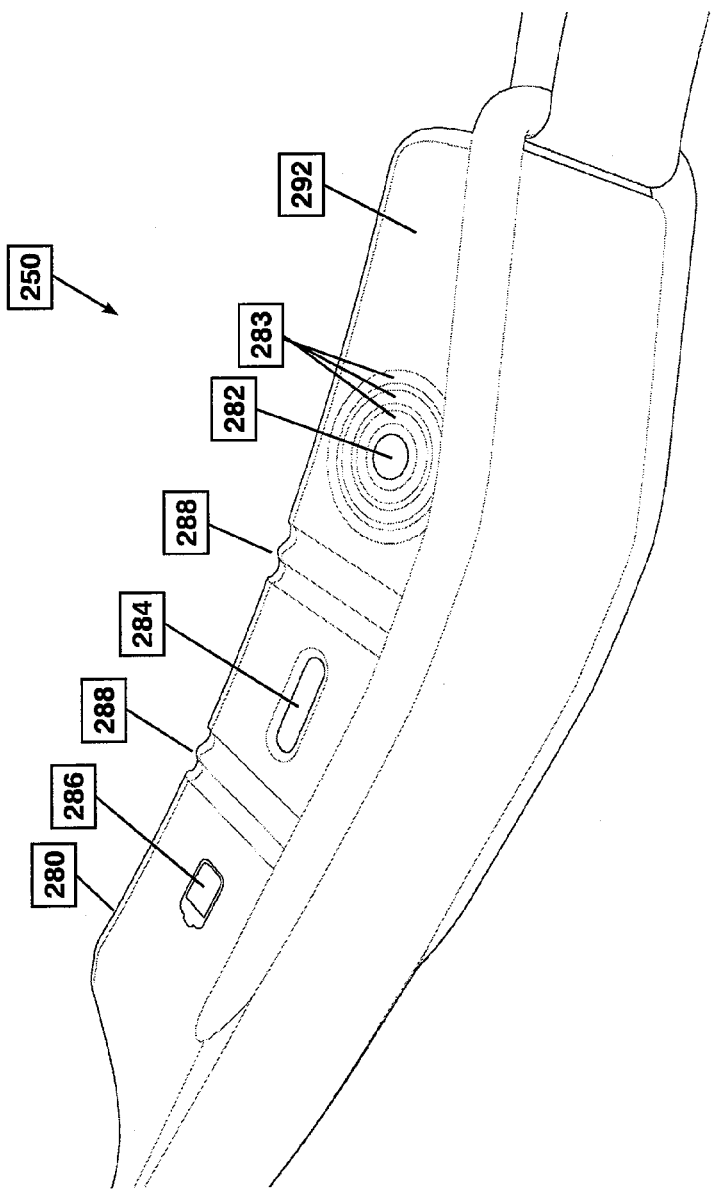
FIG. 14 illustrates a partial top perspective view of the embodiment shown in FIG. 10.

As shown in FIGS. 13-14, indicator 282 may comprise one or more LED's for visually indicating information to a wearer of apparatus 250. In one embodiment, the one or more LED's comprises a series of LED's oriented as concentric rings 283. In another embodiment, the one or more LED's comprises a series of LED's oriented adjacent to one another.

When tracking apparatus 250 is in geofence mode, each of the one or more LED's may illuminate depending on the distance of the wearer of apparatus 250 relative to the preprogrammed geometric center of the "fence." Alternatively, each of the one or more LED's of indicator 282 may be programmed to visually indicate the GPS, cellular, radio, or other wireless signal strength received by tracking apparatus 250.

Figure 15:
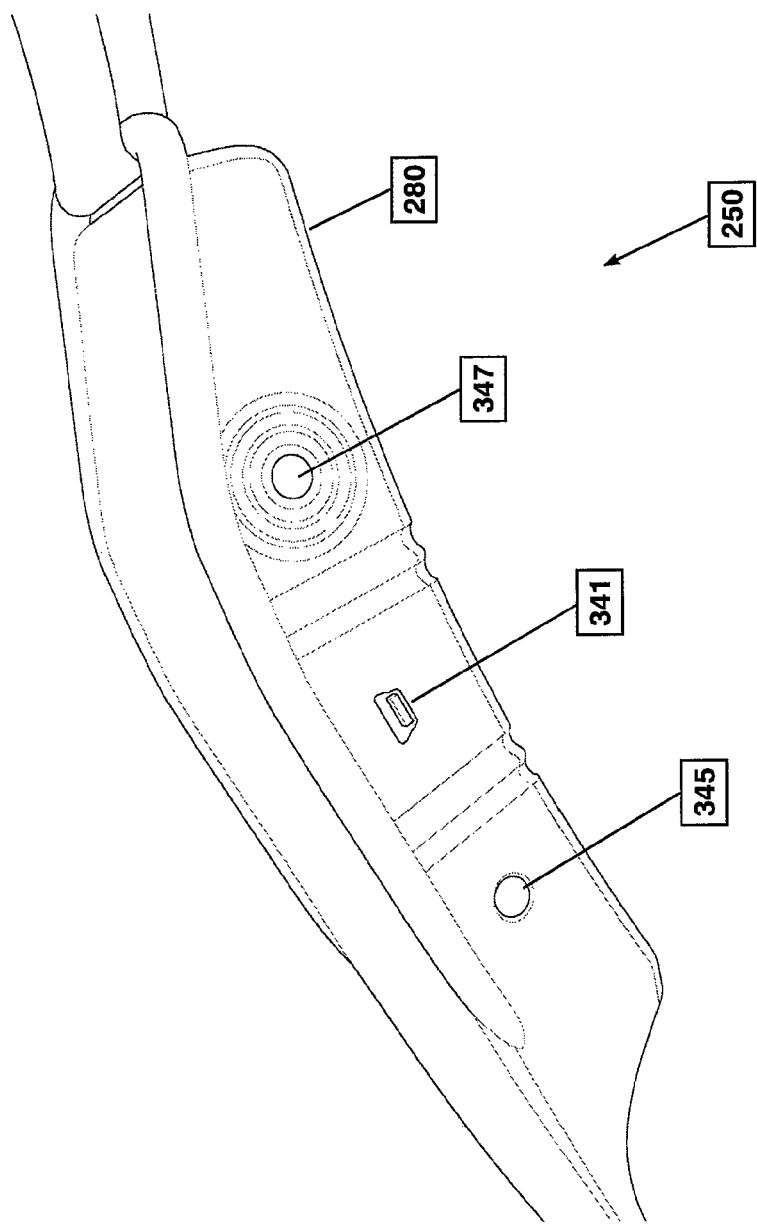

Referring to FIG. 15, belt 260 is shown as including user input device or actuator 345, port 341, and user input device or actuator 347. Actuators 345 and/or 347 may be programmed to initiate any one of a number of operating modes, such as to request medical assistance for nonemergencies or simply to send one of a list of available predetermined messages to a predetermined recipient. The message, for example, may include manually or automatically sending the GPS location of the wearer of tracking apparatus 250 at intervals chosen by the wearer or at predetermined intervals. In one embodiment, actuator 345 activates optional services, which may be available to the wearer of tracking apparatus 250 according to the particular service plan that the wearer subscribes to with a service plan provider. In another embodiment, actuator 347 serves to operate a standard service available to the wearer of tracking apparatus 250, such as operating geofence mode. In yet another embodiment, port 341 comprises a mini-USB data port for transmitting and receiving data to and from transceiver 320 and to recharge battery 326 using a mini-USB cable connected to, for example, a personal computer. As shown in FIGS. 11-12, port 341 may be connected to transceiver control module 322 and/or communications module 330 via cable 328.

Figure 16:
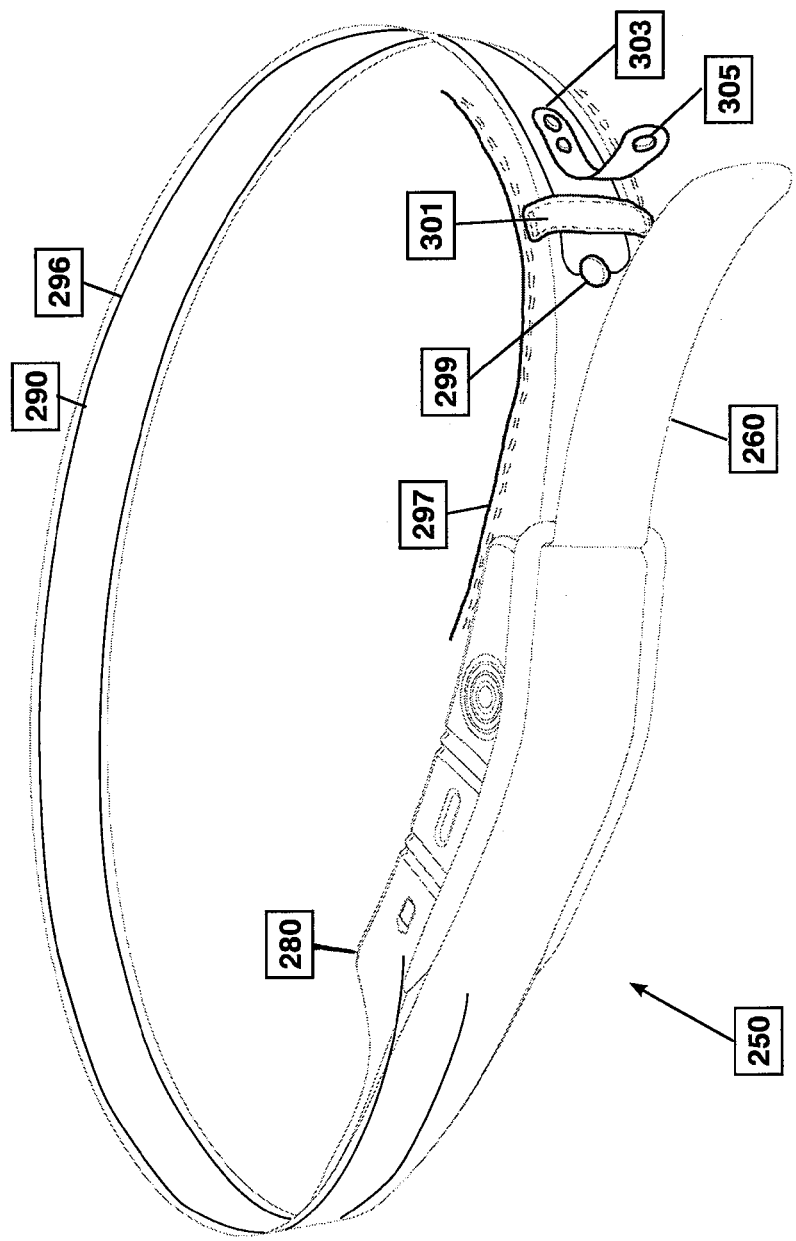
FIG. 16 illustrates a perspective view of the embodiment of FIG. 10 incorporating a security feature.
Figure 17:
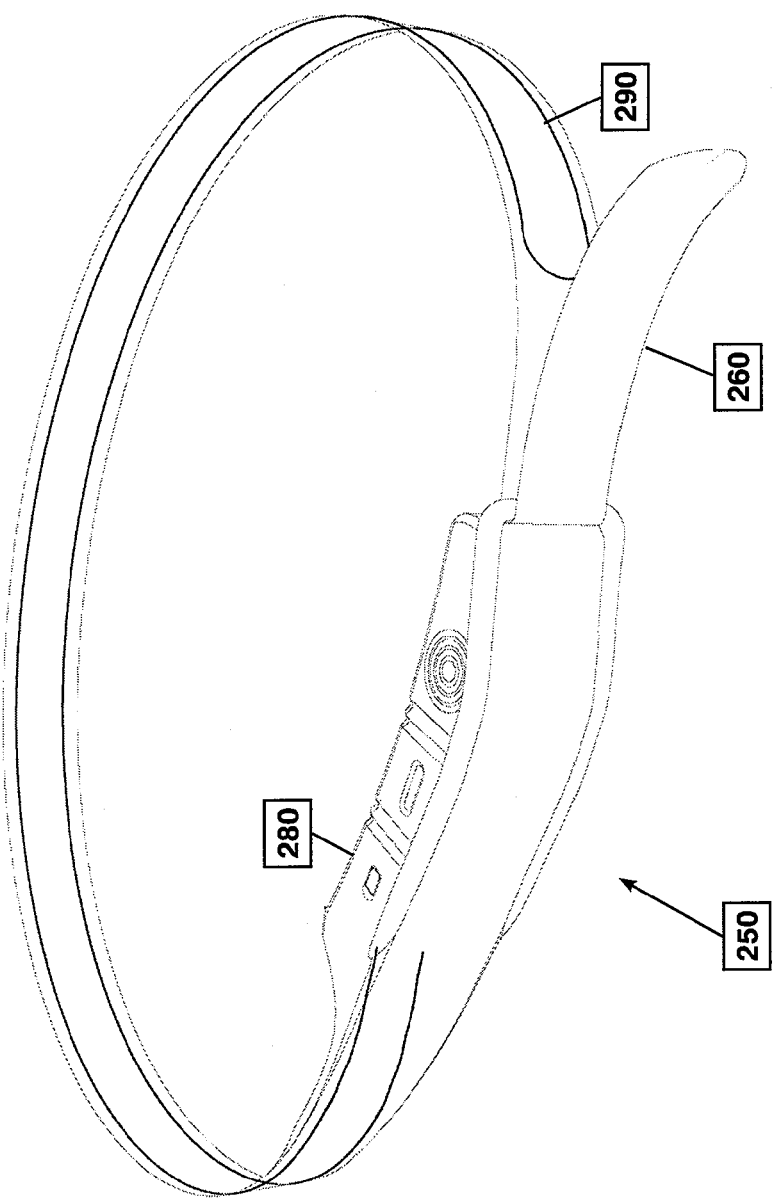
FIG. 17 illustrates a perspective view showing one aspect of the security feature shown in FIG. 10.

FIGS. 16-17 show elements of security system 296 for a wearer of apparatus 250. For example, FIG. 16 shows electrical security loop 290, which may comprise an electrical conductor that is electrically connected to transceiver 320, male security connector 299, female security connector 305, and one or more security straps 303. In operation, the wearer of belt 260 may insert belt 260 through one or more trouser belt loops 301 of trouser 297. Next, the wearer may fasten security strap 303 around trouser belt loop 303 by snapping or otherwise securing female security connector 305 onto male security connector 299 so as to close an electrical circuit using electrical security loop 290 thereby arming a security notification feature of tracking apparatus 250.

In one embodiment, if a wearer of belt 260 subsequently disconnects belt 260 from trousers 297 without first disarming the security notification feature, then a security message will be discretely sent to a predetermined recipient and/or central receiving office notifying them of at least the GPS location of the wearer and the disconnected status of belt 260 upon the wearer. The security notification feature may be armed and disarmed remotely only by a predetermined person through, for example, remote device 205, which may include a remote computer, a cell phone, or a PDA. In another embodiment, the security notification feature may be armed and disarmed by the wearer. In yet another embodiment, a security code is required to arm and disarm the security notification feature. Messages concerning the armed or disarmed status may be communicated automatically at regular or scheduled intervals or manually when desired either by the wearer of belt 260 or by the remote recipient of the message. The elements of security system 296 may be adapted for use in any of the embodiments described above and shown in FIGS. 1-5, and 9.

Belt 260 may be worn on one's waist by target object 210 as a primary belt on one's waist to support one's trouser's, or belt 260 may be worn in addition to a first belt worn by target object 210 to supplement the first belt. Similarly, belt 260 may be configured as an animal collar and worn by the animal (i.e., target object 210) either by itself or with one or more other collars.

Figure 18:
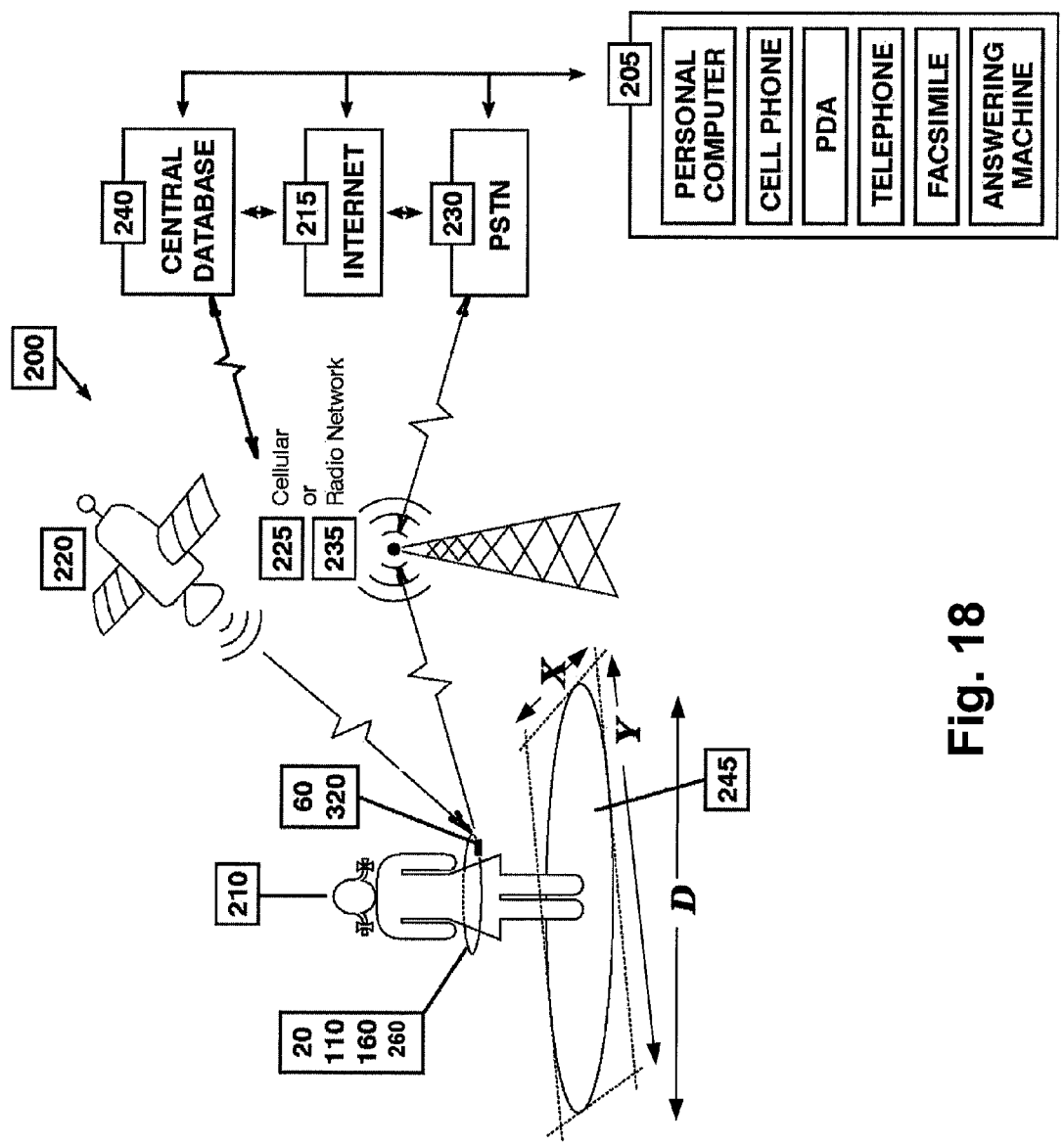
FIG. 18 is a schematic view of a system for tracking a target object of the present invention.

FIG. 18 illustrates tracking system 200 incorporating the improvements of the present invention. Tracking system 200, for example, may include tracking apparatus 10, 100, 150, 250 worn by target object 210 to be tracked. Tracking system 200 may also comprise any one of a number of communication schemes, such as, for example, global positioning system (GPS) 220, cellular network 225, public switched telephone network (PSTN) 230, by radio frequency (RF) 235, to communicate the position and/or location of target object 210 to central server or database 240 and/or to one or more remote devices 205 used by one or more persons interested in knowing the present and past location of target object 210.

Tracking system 200 may operate 24 hours per day or only during specific periods throughout a day, such as before, during, or after school or work hours. During operation, tracking system 200 may continuously and/or intermittently and/or at random intervals track target object 210, and may occasionally send a test signal to transceiver 60,320 to determine or verify system communication status. To track object 210, geographic position and/or location information data, including speed and direction information, may be received by transceiver 60,320 by either antenna 70,334 or the radio modem. Transceiver 60,320 may transmit the geographic position and/or location information to central database 240, or to an Internet connected computer using the radio modem embedded in communications module 68,330 of transceiver 60,320. The radio modem may transmit position and/or location information to central database 240 and also, if selected, to one or more e-mail addresses, Internet addresses, cell phones (via, for example, text messaging), personal digital assistants (PDA's), and websites, for example.

To track target object 210, the tracking system 200 may transmit position and/or location information data to central database 240. Central database 240 may be stored on a remote computer that is accessible via the Internet using, for example, another remote computer, a cell phone, or a personal digital assistant (PDA). Central database 240 may also be stored on a server computer that is in communication with the remote computer. For example, the remote computer and the server computer may form a client/server relationship.

Tracking system 200 may employ any one of a number of known connectivity protocols, such as TCP/IP, FTP, SFTP, Telnet SSH, HTTP, SHTTP, RSH, REXEC, etc. The remote computer and/or the server computer may each include an operating system, such as Windows®, but it should be understood that the remote computer and/or server computer may each employ any one of a number of known operating systems, such as LINUX®, UNIX®, MAC OS®, Mozilla®, etc.

To access, configure, or monitor tracking system 200, users may access a software application having access to central database 240 via, for example, an Internet web browser on remote device 205, such as a remote computer, PDA, or cell phone. It should be appreciated by one of skill in the art, however, that other applications other than a web browser may also be employed to act as an interface between the software application and remote device 205.

A user may also configure transceiver 60,320 remotely using, for example, an Internet website interface, such as a web browser, or alternatively, using a touch screen electronically or wirelessly connected to transceiver 60,320, or by physically pressing on one or more actuators 86 (through, perhaps, one or more buttons 92). It should be appreciated by one of skill in the art that other methods may also be employed to access and configure transceiver 60,320.

Independent of the manner in which a user may connect to and/or interface with transceiver 60,320, transceiver 60,320 may be configured to operate in one of at least 2 modes: standard mode and geofence mode. Standard mode may comprise position and/or location information data that is made available by tracking system 200 near real-time to one or more persons interested in knowing the present and past location of target object 210. Geofence mode may be used in combination with standard mode, and may comprise a user-adjustable and remotely programmable, invisible area 245 surrounding target object 210. Area 245 may be defined by one or more radii defining a circle or an ellipse. Alternatively, area 245 may be defined by x-y coordinates defining a polygon, for example. Area 245 may be defined by an address, such as a street address, or the name of a State. Area 245 may optionally be defined by a collection of addresses, streets, zip codes, towns, counties, or states. As used herein, a user is one or more persons interested in knowing the present and past location of target object 210.

The selection of standard mode or geofence mode as well as the definition of area 245 may be configured by a user at a remote computer or other Internet connected device and downloaded to transceiver 60,320 in near-real time for immediate or delayed implementation. For delayed implementation, geofence mode of tracking system 200 may include a delay feature and/or timer to, for example, activate geofence mode after a certain duration, at a certain time of day, for a certain period of a day, over multiple days, etc.

Geofence mode may alert one or more persons interested in knowing the present and past location of target object 210 if/when target object 210 exits the predefined area 245, which defines a virtual perimeter fence. Alerts may be sent to one or more persons interesting in knowing the present and past location of target object 210 via an alert message transmitted by communication module 68,330 of transceiver 60,320 via one or more communication methods, such as a cellular or other wireless network, to one or more predetermined destinations, such as one or more e-mail addresses, Internet addresses, cell phones (via, for example, text messaging), personal digital assistants (PDA's), websites, or to central database 240, for example. Transmission of alert messages may be performed over a cellular network and a wireless network simultaneously. Similarly, alert messages may be simultaneously transmitted to one or more recipients and or locations (i.e., e-mail addresses, etc.).

In addition to alert messages, a "battery low" warning may be transmitted to a remote user of the present invention. If a battery is low on charge, transceiver 60,320 may automatically adjust to a less-frequent record and/or transmit mode. In addition, a user may also manually control the record/transmit rate through selection of one of several data plans from a particular service provider for tracking system 200.

The choice of communication method from transceiver 60,320 of tracking system 200 may be manually predetermined or automatically and dynamically determined according to the strength of nearby cellular or wireless receiving/transmission stations. For example, tracking system 200 may be configured to automatically select the best communication method to use depending on the strength of available cellular and/or other wireless signals received by transceiver 60,320.

Transceiver 60,320 may be configured to periodically or continuously record position and/or location data and periodically or continuously transmit the stored position and/or location data by communication module 68,330 of transceiver 60,320 via one or more communication methods, such as via cellular or other wireless network, to one or more predetermined destinations, such as, for example, one or more e-mail addresses, Internet addresses, cell phones (via, for example, text messaging), personal digital assistants (PDA's), websites, or to central database 240. Alternatively, position data may be stored in nonvolatile memory for subsequent download using port 340.

Transceiver 60,320 may also include a sleep mode to minimize the power required to operate transceiver 60,320 and to maximize the life of battery 64,326 between charges or replacement. In addition, transceiver 60,320 may include a motion sensor for activating a record/transmit session when transceiver 60,320 is in sleep mode. After a predetermined period of time where the motion sensor senses no movement, transceiver 60,320 may be programmed to return to the sleep mode.

As an alternative to using a motion sensor to return transceiver 60,320 to sleep mode, transceiver 60,320 may also be programmed to compute differences in measured position and/or location data over two or more measurement or time intervals. Thus, if the difference in the measured position and/or location data of target object 210 or belt 20,110,160, 260 over two or more measurement or time intervals is within a predetermined value or tolerance range, then transceiver 60,320 may be programmed to automatically return to sleep mode.

Transceiver 60,320 may be manually turned off or placed into sleep mode by a user via one or more buttons 92 on belt 20,110,160,260 or remotely via a command entered on an Internet web page, for example. Additionally, a user may perform these functions by simply contacting a service provider for tracking system 200 and instructing the service provider to initiate the requested commands to transceiver 60,320 of belt 20,110,160,260.

As shown in FIG. 18, cellular or other wireless network may be connected to a public switched telephone network (PSTN) for transmission of position and/or location data to a user. It is contemplated, however, that pathways other than PSTN may be employed for land-based transmission of position and/or location data, such as via fiber optics and coaxial or other cable. It is also contemplated that voice recognition or other audio technology may be employed to audibly communicate position and/or location data to a user, such as by land-based telephone or cellular telephone phone systems and apparatuses, by personal computer, or by any other apparatus capable of transmitting audible speech to a user.

While specific embodiments of the invention have been described in detail, it will be appreciated by those skilled in the art that various modifications and alternatives to those details could be developed in light of the overall teachings of the disclosure. Accordingly, the particular invention disclosed is meant to be illustrative only and not limiting as to the scope of the invention which is to be given the full breadth of the appended claims and any equivalents thereof.

What is claimed is:

1. A GPS tracking apparatus, comprising:
   a belt configured to releasably attach to a person or an animal;
   a transceiver enclosure integrally formed with the belt, the enclosure comprising at least one flexible hinge on at least an interior surface of the enclosure for enhancing flexion of the enclosure; and
   a GPS transceiver for transmitting the GPS position of the belt to, and for receiving at least one signal from, at least one of a plurality of remote devices, the transceiver comprising
   a control module having a CPU for processing GPS-acquired position data, the control module including nonvolatile memory for storing the position data;
   a GPS antenna electrically yet flexibly connected to the control module for receiving the position data from a GPS satellite network;
   a communications module electrically yet flexibly connected to the control module for wirelessly transmitting the position data to at least one of the plurality of remote devices; and
   a portable power source electrically yet flexibly connected to the control module for electrically powering the transceiver,
   wherein the transceiver automatically selects one of a plurality of pathways for transmitting the position data to at least one of the plurality of remote devices depending on a signal strength of each of the plurality of pathways.

2. The apparatus of claim 1, wherein the plurality of pathways comprises at least one of a cellular network, a wireless network, a public switched telephone network, and the Internet.

* * * * *